United States Patent [19]

Levine

[11] Patent Number: 4,490,744

[45] Date of Patent: Dec. 25, 1984

[54] SMEAR REDUCTION TECHNIQUE FOR CCD FIELD-TRANSFER IMAGER SYSTEM

[75] Inventor: Peter A. Levine, Trenton, N.J.

[73] Assignee: RCA Corporation, New York, N.Y.

[21] Appl. No.: 407,926

[22] Filed: Aug. 13, 1982

Related U.S. Application Data

[63] Continuation-in-part of Ser. No. 393,733, Jun. 30, 1982, abandoned.

[51] Int. Cl.³ .............................................. H04N 3/14
[52] U.S. Cl. ...................................... 358/213; 357/24
[58] Field of Search ..................... 358/213; 357/24 LR

[56] References Cited

U.S. PATENT DOCUMENTS

| | | |
|---|---|---|
| 3,777,061 | 12/1973 | Takemura . |
| 4,010,319 | 3/1977 | Levine ................................. 358/213 |
| 4,032,976 | 6/1977 | Levine ................................. 358/213 |
| 4,237,488 | 12/1980 | Takemura ........................... 358/163 |

FOREIGN PATENT DOCUMENTS 56-12179  2/1981  Japan ................................... 358/213

Primary Examiner—Howard W. Britton
Assistant Examiner—John K. Peng

Attorney, Agent, or Firm—Joseph S. Tripoli; George E. Haas; George J. Seligsohn

[57] ABSTRACT

Three embodiments of an improved smear reduction technique, for reducing substantially all the smear in a CCD field-transfer imager system due to the presence of a bright spot in the projected image, regardless of whether the bright spot remains fixed or whether the bright spot moves between successive field periods. Prior smear reduction techniques were not effective with respect to a moving bright spot. Structurally the improved system employs a CCD field-transfer imager including a line register, in addition to conventional A and B, for collecting smear charge produced in the A register during each successive field period. The smear line register cooperates with associated circuitry to provide the improved smear reduction. In a first and second of the three embodiments, the imager includes a conventional C line register for deriving a smeared video output applied as an input to the associated circuitry, and the smear line register is an additional line register, known as the D register. In a third of the three embodiments, the conventional C register is omitted and a single line register, known as a C-D register, performs the functions of both the C and D line registers in the first and second embodiments.

10 Claims, 16 Drawing Figures

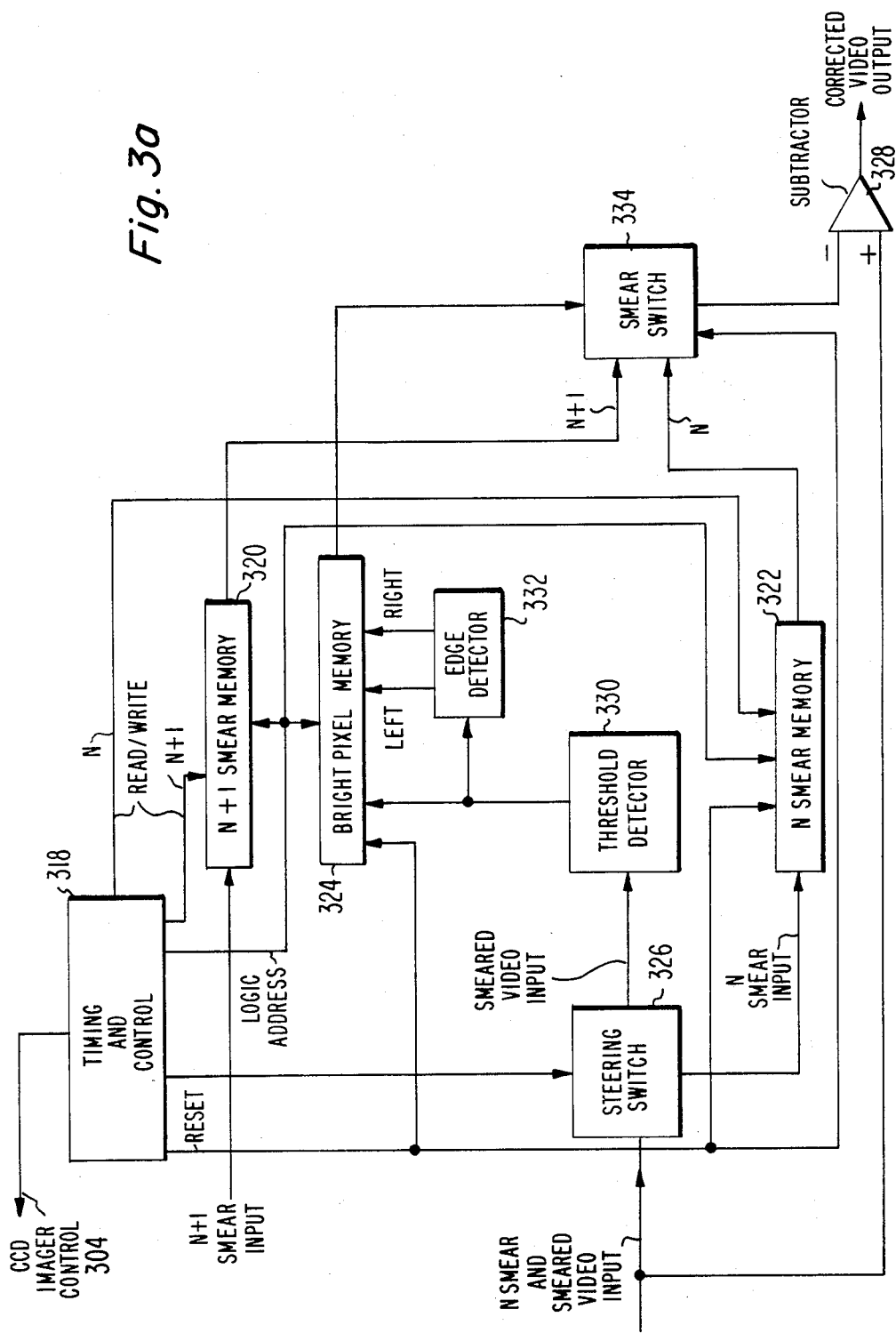

SMEAR REDUCTION TECHNIQUE FOR CCD FIELD-TRANSFER IMAGER SYSTEM

CROSS-REFERENCE TO RELATED APPLICATION

This application is a continuation-in-part of application Ser. No. 393,733, filed June 30, 1982, now abandoned.

BACKGROUND OF THE INVENTION

1. Field of the Invention

This invention relates to charge-coupled device (CCD) field-transfer imager systems incorporating improved smear reduction techniques.

2. Description of the Prior Art

Reference is made to my prior U.S. Pat. No. 4,010,319, entitled "Smear Reduction in CCD Imagers," which issued Mar. 1, 1977, and to my prior U.S. Pat. No. 4,032,976, also entitled "Smear Reduction in CCD Imagers," which issued June 28, 1977. Both of these patents recognize the fact that normally a CCD field-transfer imager continues to be illuminated by a projected image while field-transfer is taking place. This results in smear charge being generated by bright spots in the image.

The obvious solution to this problem is to utilize a shutter to prevent a projected image from reaching the CCD imager during the transfer portion of each successive field. However, in view of the requirement for a motor, a rotating disk or the like and other mechanical parts, with their inherent limitations (power consumption noise, and so on), thus is not a preferred approach.

My U.S. Pat. No. 4,010,319 suggests the use of smear reduction circuitry which is intended to subtract out the smear included with the video at the output of the CCD imager so that a corrected video without significant smear is available for producing a television display of the projected image. The smear reduction technique disclosed in my U.S. Pat. No. 4,010,319 operates very well in substantially reducing all the smear so long as the projected image containing one or more bright spots remains fixed in position. However, when the position of the projected image is moved in a direction perpendicular to the direction of field-transfer (as is the case when a CCD field-transfer imager television camera is panned either left-to-right or right-to-left), the smear reduction circuitry disclosed in my U.S. Pat. No. 4,010,319 is not effective in substantially reducing all of the undesired smear.

My other U.S. Pat. No. 4,032,976 discloses a much simpler and less expensive smear reduction technique than that disclosed in my U.S. Pat. No. 4,010,319. However, it is only capable of reducing a certain portion, but not all, of the smear within each field period. This is true regardless of whether the projected image is fixed or is moving.

SUMMARY OF THE INVENTION

The present invention employs a field-transfer CCD imager incorporating (in addition to the conventional A and B registers of a field-transfer CCD imager) a masked line register situated at one end of the A register, which can be loaded, during the vertical blanking portion of each successive field period, with solely smear charge that appears during that field period in respective columns of the A register. The smear charge stored in the loaded line register during a field period can be serially shifted out during a certain time interval within each field period. The improved CCD imager system of the present invention, further comprises means including this line register and responsive to pixel charge signals shifted from a masked line register (which, depending on the embodiment, may or may not be the first-mentioned line register) for reducing substantially all of the smear charge that appears in the video signal output during each successive period, regardless of whether any bright spot in the projected image remains fixed in position between successive fields periods or is moved in position between successive field periods.

BRIEF DESCRIPTION OF THE DRAWING

In the drawings:

FIGS. 2b and 2c are timing diagrams useful in describing the operation of the first embodiment of the present invention shown in FIGS. 2 and 2a;

FIG. 3a is a more detailed illustration of the CCD control and output circuitry of the second embodiment of the present invention shown in FIG. 3;

FIG. 3b is a timing diagram useful in describing the operation of the second embodiment of the present invention shown in FIGS. 3 and 3a;

DESCRIPTION OF THE PREFERRED EDBODIMENTS

Figure 1:
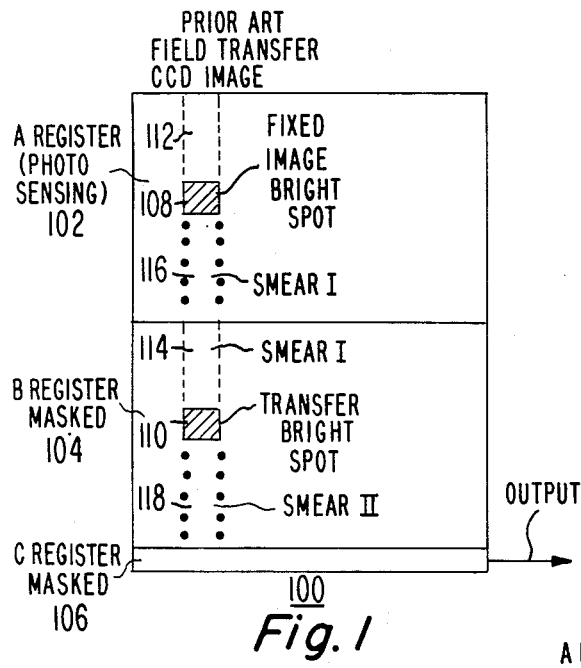
FIG. 1 schematically illustrates a conventional prior art field transfer CCD imager, incorporating A, B and C registers, and the smear effect produced by a fixed image bright spot projected on the A register thereof.

Prior art conventional field-transfer CCD imagers, of the type schematically shown in FIG. 1, are comprised of a photosensing A register 102, a masked B register 104 and a masked C register 106. Specifically, the structure of field-transfer CCD imager 100 is of the known type shown in more detail in FIG. 1 of each of my U.S.

Pat. Nos. 4,010,319 and 4,032,976. As is known in the art, A register 102 is comprised of a photosensing array of multi-phase CCD stages arranged in rows and columns. B register 104 is comprised of a corresponding array of CCD stages arranged in rows and columns, with the columns of B register 104 being contiguous with the columns of A register 102. C register 106 is comprised of a single row of CCD stages, normally with a separate stage of C register 106 being associated with each column of A and B registers 102 and 104. The stages of C register 106 are capable of being loaded in parallel and then shifted out in serial fashion to thereby produce an output of pixel charge signals from CCD imager 100.

One or more CCD imagers are often employed as the photosensing elements of a television camera. In operation, during the so-called integration time (which corresponds to the active video portion of each of successive television field periods), a scene or other image is projected onto A register 102. The incident light (or other radiant energy) of the image causes corresponding pixel charges to be produced in the various CCD stage locations of the A register, in accordance with the light intensity reaching the respective CCD stages. This results in a charge pattern of pixel charge signals, corresponding to the projected image, being stored in A register 102 at the end of each integration time, with each pixel charge signal resulting from the integration charge stored at the row-column crosspoint location of each individual CCD stage of the A register array.

Following the completion of each integration time, the pixel charge signals which have accumulated during the proceeding active video portion of a television field period are transferred, in parallel, in the column direction, during the vertical blanking portion of each of successive television field periods, from A register 102 to B register 104. During the active video portion of the next field period, the transferred charge pattern stored in B register 104 is further transferred, at most a row at a time, from B register 104 to C register 106. After C register 106 is loaded with a row of pixel charges, the pixel charges in that row are serially shifted out of C register 106 to produce a video output. The loading of the C register takes place during the flyback portion of each television scan line and the serial shifting out of the C register takes place during the active video portion of each television scan line. While all of the pixel charge signals of a proceeding field are being transferred, and then serially shifted out of, the C register, at most a row at a time, a new field is being integrated in the A register.

The resolution capability of a field-transfer CCD imager depends upon the number of rows and columns in A and B registers. A commercial imager that has been produced by RCA Corporation is SID51232, known as "Big Sid". This commercial imager is 3-phase operated and has 320 columns and 512 rows (256 rows in the A register and 256 in the B register). Even higher resolution field transfer imagers may be built in the future.

It is not desirable in many applications to employ a shutter which permits a projected image to impinge on the A register during the active video portion of each successive field period, but which masks the A register during the vertical blanking portion of each successive field period. Therefore, it is usual to leave the A register unmasked during the transfer of the charge pattern from the A register to the B register. The result is that the transfer of each pixel charge in the column direction from the A register to the B register generates some amount of smear charge which is added to all of the pixel charges in that column. In scenes without any bright spots, the only effect of this is to produce an overall reduction in contrast which is not too noticeable in the ultimately displayed picture.

The presence of a bright spot in a projected image on the A register results in the production of a relatively large amount of charge in the pixel locations within the area of the A register illuminated by the bright spot. FIG. 1 shows the area of the fixed image bright spot 108 on A register 102. A to B transfer results in the pixel charges forming fixed image bright spot 108 being transferred in the column direction to the corresponding area of transfer bright spot 110 in B register 104. As indicated in FIG. 1, the vertical smear charge, designated smear I, is generated by the continuing illumination of area of bright spot 108 while the transfer from the A to B register is taking place.

In particular, the pixel charges generated within area 112 (defined by dashed lines), situated above bright spot 108 on A register 102, are transferred to area 114 (defined by dashed lines) situated above transfer spot 110 of B register 104. Thus, during transfer, all of the pixel charges of area 112 must pass under the illumination of bright spot 108. The extra charge produced by this illumination constitutes the area 114 portion of smear I (defined by dashed lines) which is transferred to B register 104 during a given field period. The area 116 portion of smear I (defined by dotted lines), situated in A register 102 below bright spot 108, results from the transfer of the portion of "phantom" rows (situated outside of A register 102) above area 112, through the rows occupied by area 112 and bright spot 108, to the rows of area 116 of A register 102. Passage of these "phantom" rows through bright spot 108 during A to B transfer results in generating the portion of smear charge I that is stored in area 116 after the A to B transfer. This portion of smear charge I, which is stored in area 116 of register 102 in response to an A to B transfer which takes place during a given field period, is further transferred during the A to B transfer of the next field period to B register 104, where it appears as smear charge II in area 118, situated below transfer bright spot 110.

It follows from the above discussion that the smear charge II in area 118 of B register 104 is originally generated during the field period which precedes the field period during which the area 114 portion of smear charge I in B regsiter 104 is originally generated. If the position of the imager bright spot remains fixed between successive field periods (which is the case in FIG. 1), the area 118 of smear charge II will remain aligned in B register 104 with transfer bright spot 110 and the area 114 of smear charge I.

Figure 1A:
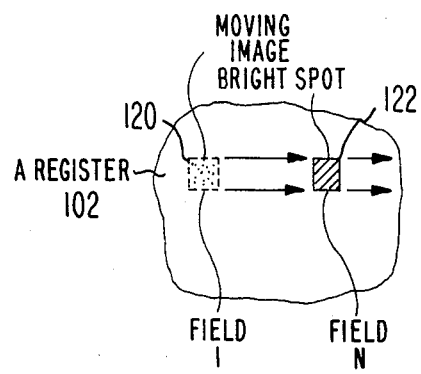
FIGS. 1a and 1b illustrate a moving image bright spot projected on the A register of a field-transfer CCD imager.

When a field-transfer CCD imager is employed in a television camera, there will be times when the television camera is panned in either in a left-to-right direction or in a right-to-left direction. Assume, by way of example, a left-to-right panning of the television camera, such as that shown in FIGS. 1a and 1b. As shown in FIG. 1a, the bright spot 108a on A Register 102 which occupied area 120 during an initial field period 1, is moved in a left-to-right direction during many successive field periods, so that bright spot 108a occupies area 122 during some later field period N. Since field periods occur at the relatively high rate of 60 Hz, at any normal panning speed, image bright spots in the image display are generally of sufficient width to be moved in position less than the entire width of a moving bright spot in a single field period. Thus, as in FIG. 1b, if the moving bright spot during some later field period N occupies area 122, the area 124, occupied by the moving bright spot during the next following field period N+1, may overlap area 122 to an appreciable extent (although very narrow moving bright spots may not). However, there will still be a significant offset between the respective positions of areas 122 and 124.

Figure 1C:
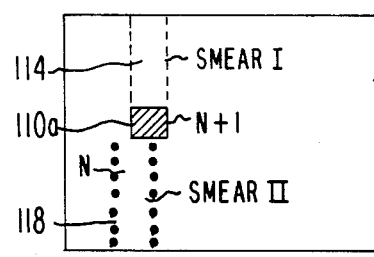
FIG. 1c illustrates the smear effect in the B register of a field-transfer CCD produced by a projected moving image bright spot.
Figure 1B:
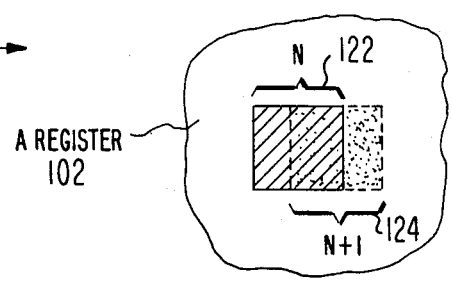

As shown in FIG. 1c, the result of this offset in the respective positions of the moving bright image, that is projected on A register 102, is that, in B register 104, there will be a corresponding offset in position of both the area 114 of smear charge I and transfer bright spot 110a with respect to the position of the area 118 of smear charge II. This is because the position of area 118 of smear charge II is determined by the position of area 122 of the moving image bright spot during field period N, shown in FIG. 1b, while the positions of both area 114 of smear charge I and of transfer bright spot 110a are determined by the position of area 124 of the moving image bright spot during field period N+1, shown in FIG. 1b.

The smear reduction technique disclosed in my prior U.S. Pat. No. 4,010,319 senses and stores a smear input derived only from the smear charge II in B register 104, and then subtracts this stored smear from the pixel charge signals serially shifted out from the C register of each row, in turn, of the entire field then stored in the B register. When the projected image bright spot remains fixed between successive fields, as is shown in FIG. 1, smear charge I area 114, and transfer bright spot 110 remain aligned with smear charge II area 118. Therefore, in the case of a projected fixed image bright spot, the smear reduction technique disclosed in my U.S. Pat. No. 4,010,319 is effective in substantially reducing both smear I and smear II.

Figure 1D:
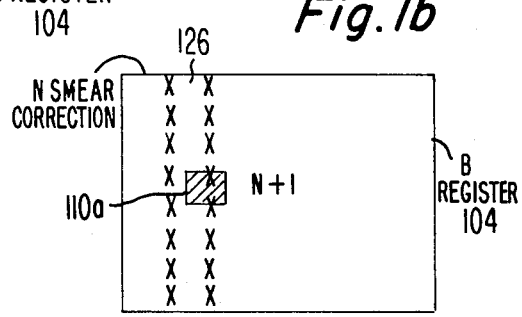
FIG. 1d illustrates a limitation of the prior art smear reduction technique disclosed in my U.S. Pat. No. 4,010,319 in reducing all the smear when a projected image bright spot is moving.

In the case of a projected moving image bright spot, the smear reduction technique disclosed in my U.S. Pat. No. 4,010,319 still provides only the N smear correction 126, shown in FIG. 1d. The result is that, in the case of a moving image bright spot, the smear reduction technique disclosed in my U.S. Pat. No. 4,010,319 is substantially fully effective in reducing only smear II. It is less effective in reducing smear I because of the offset between smear I, which is derived from the N+1 field, and N smear correction 126. In addition, the presence of N smear correction 126 results in the display of transfer bright spot 110a exhibiting a dark streak at one edge thereof and an extremely bright streak at the other edge thereof. The dark streak is due to the presence of N smear correction 126 and the absence of transfer bright spot 110a (left of the left edge of transfer bright spot 110a), and the extremely bright streak is due to the presence of transfer bright spot 110a and the absence of N smear correction 126 (right of the right edge of N smear correction 126). These bright and dark streaks are present in the displayed image below the bright region. Therefore, when the projected image bright spot is moving, the smear reduction technique disclosed in my U.S. Pat. No. 4,010,319 creates new noticeable defects in the displayed image. Noticeable smear applies to the smear reduction technique disclosed in my U.S. Pat. No. 4,032,976, since the smear reduction technique disclosed in my U.S. Pat. No. 4,034,976 is only intended to substantially reduce the smear II portion of the smear, regardless of whether projected image bright spot is fixed or is moving.

FIGS. 2, 2a, 2b and 2c all relate to a first embodiment of the present invention for reducing substantially all of the smear, regardless of whether the projected image bright spot is fixed or is moving. This first embodiment, in part, makes use of a smear reduction technique similar to that disclosed in my U.S. Pat. No. 4,032,976.

Figure 2:
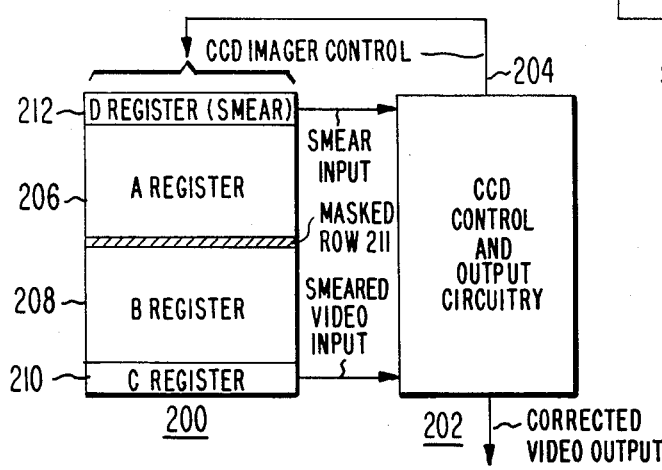
FIG. 2 is a block diagram which schematically illustrates a first embodiment of the present invention.
Figure 2A:
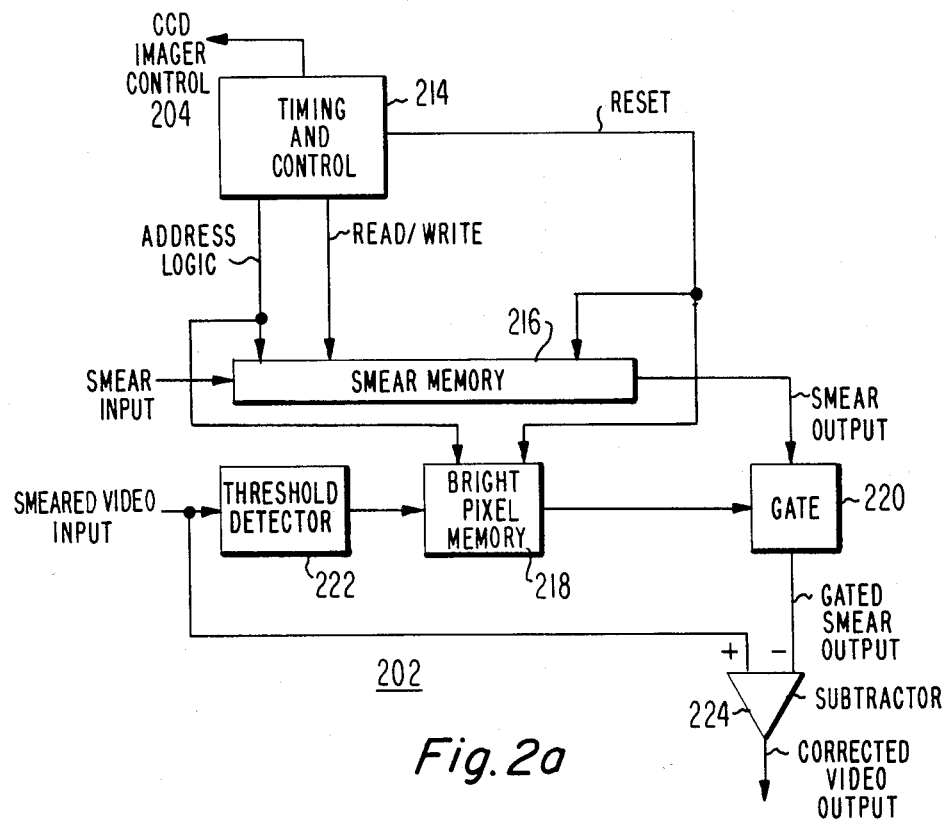
FIG. 2a is a more detailed illustration of the CCD control and output circuitry shown in FIG. 2.

Referring to FIG. 2, there is shown a CCD field-transfer imager system comprised of CCD field-transfer imager 200 and CCD control and output circuitry 202 having CCD imager control output 204 coupled to imager 200. Imager 200 comprises conventional A register 206, B register 208 and C register 210. A register 206 includes a masked row 211 situated adjacent B register 208. The masking of row 211, while not absolutely essential, is desirable to prevent a bright image from being incident thereon. In addition, imager 200 includes D register 212, located as shown at the top of A register 206 (i.e., at that one of the two ends of A register 204 which is remote from B register 206). D register 212 is a line register, which is operated, in the manner described below, to be loaded with smear charge that corresponds to the smear charge of the current field period (i.e., the N+1 field period) stored in B register 104 and serially shifted out, a row at a time, from C register 106. Further, loaded D register 212 may be shifted out serially to provided a smear input to circuitry 202. The details of circuitry 202 are shown in FIG. 2a, discussed below. At this time, all that need be said is that circuitry 202 provides all the control and timing signals of CCD imager control output 204 that are applied to imager 200 to control the operation of A register 206, B register 208, C register 210 and D register 212. Also, circuitry 202 receives a smear input from D register 212 and a smeared video input from C register 210 and produces a corrected video output therefrom. Any smear originally present in the smeared video input to circuitry 202 is substantially reduced in the corrected video output therefrom.

As shown in FIG. 2a, circuitry 202 comprises timing and control means 214. Timing and control means 214 includes a master oscillator and associated frequency dividers for determining successive field periods and, within each period, a vertical blanking period portion and an active video and C register readout portion. During the active video and C register readout period, timing and control means 214 derives conventional CCD clock voltages that are applied to imager 200 over CCD imager control 204 (the single line represents the multiple conductors of a bus), for loading each row of B register 208 into C register 210, at most a row at a time, and then serially shifting out the loaded C register 210 to derive the smeared video input for that row. In addition, timing and control means 214, during part of each vertical blanking period portion, derives conventional CCD clock voltages, which are applied over CCD imager control 204 to A register 202 and B register 208, to effect the transfer from A register 206 to B register 208. During the remaining part of each vertical blanking period portion, timing and control means 214 derives CCD clock voltages, which are applied over CCD imager control 204, to control A register 206 and D register 212 in accordance with the principles of the first embodiment of the present invention, shown in FIGS. 2 and 2a.

Figure 2B:
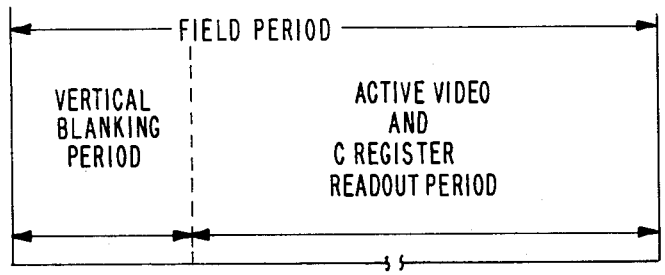
Figure 2C:
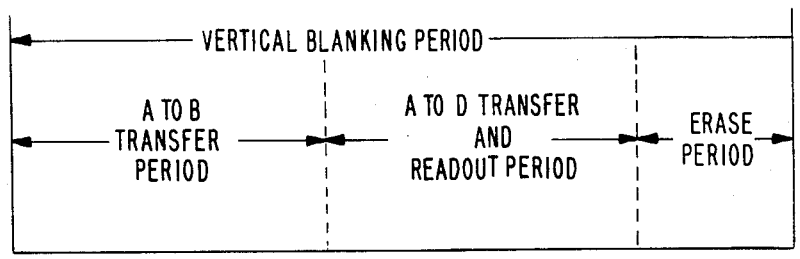

FIGS. 2b and 2c are timing diagrams, discussed below, which show, respectively, a field period divided into vertical blanking and active video portions, and a vertical blanking period further divided into three different control period parts by the timing and control signals supplied to imager 200 from timing and control means 214 over CCD imager control 204.

Timing and control means 214 further derives address logic, which is applied as a control input to smear memory 216 and bright pixel memory 218. Timing and control means 214 also derives a read/write signal which is applied as a control input to smear memory 216. Smear memory 216 is a line memory having a separate memory location corresponding to each column of CCD field-transfer imager 200. In its write mode, smear memory 216 stores information corresponding to the smear input thereto at a column-address memory location thereof determined by the address logic. Smear memory 216 may be a reclocked recirculating analog delay line having an overall cycle delay equal to one television scan line period. However, preferably, smear memory 216 is a digital random access memory having an analog-to-digital converter at its input and a digital-to-analog converter at its output. In this case, each memory location stores a sufficient number of bits to define the level of the smear input stored at that location. When in a read mode, smear memory 216 reads out the smear stored at each memory location in accordance with the address logic and applies a smear output as a signal input to normally closed gate 220.

The smeared video input is applied through threshold detector 222 as an input to bright pixel memory 218. Threshold detector 222 only produces an output therefrom in response to the level of a pixel charge signal from C register 210 exceeding a predetermined threshold that is set to permit only bright pixel charge signals to exceed this threshold. The output of threshold detector 222, in response to a bright spot, is a pulse comprised of contiguous pixels, the number of which is determined by the width of the bright spot. The bright pixel memory 218 is generally similar to smear memory 216, but need only store a single bit at each column-address memory location, which location is determined by the address logic applied as a control input to bright pixel memory 218. At the end of each field period, timing and control means 214 applies a reset signal to both smear memory 216 and bright pixel memory 218.

The output from bright pixel memory 218 is applied as a control input to normally closed gate 220, so that only in the presence of an output from bright pixel memory 218 is the smear output from smear memory 216 forwarded through gate 220 as a minus input to subtractor 224. The smear charge signals forming the smeared video input are applied as a plus input to subtractor 224. Subtractor 224 produces a signal output proportional to the difference between its plus and minus inputs, the output from subtractor 224 constituting the corrected video output of circuitry 202.

Referring to FIG. 2b, each field period is divided into a vertical blanking period portion (during which the television display of the image sensed by a CCD field-transfer imager during each successive field is blanked) and an active video and C register readout period portion (during which the image sensed by a CCD field transfer imager during each successive field is displayed). In accordance with the principles of the first embodiment of the present invention, each vertical blanking period portion of a field period (shown in FIG. 2c) is further divided into a first-occurring A to B transfer period part, followed by a second-occurring A to D transfer and readout period part, and then followed by a third-occurring erase period part.

The first-occurring A to B transfer period part, which is conventional in CCD field-transfer imagers, needs no further description. The third-occurring erase period part employs the teachings of my prior U.S. Pat. No. 4,032,976. As disclosed in my U.S. Pat. No. 4,032,976, any smear charge remaining in the A register after A to B register transfer has taken place, can be erased by applying an erase control signal to the A register for a short period following the A to B register transfer. This is accomplished by driving the CCD stages of the A register into accumulation, (which assumes that the A register described in my U.S. Pat. No. 4,032,976 is a surface-channel device). However, the same erase function can be performed for a buried-channel device A register with anti-blooming structure, by a corresponding erase signal that collapses the storage wells in the A register to thereby remove any remaining smear in the A register by a current flow into the blooming drains of the A register. For a buried-channel device without anti-blooming structure, storage wells can be completely collapsed by the erase signal, to thereby spread the smear charge uniformly over the entire imaging area into a low DC level charge. This low DC level charge can be sampled and subsequently subtracted from the smeared video using a clamp circuit. Therefore, the basic teaching of my prior U.S. Pat. No. 4,032,976 applies to an A register comprised of a buried-channel device, with or without anti-blooming structure, as well as to an A register comprised of a surface-channel device. Further, if desired, a preliminary erase period part (not shown) occurring between first and second period parts, (i.e., immediately following the A to B register transfer) may also be employed, in addition to the third-occurring erase period part shown in FIG. 2c.

In any case, referring to FIG. 1, for reasons to be described below, smear charge in area 112, in A register 102, is substantially reduced by the application of an erase signal to the A register in accordance with the basic teaching of my prior U.S. Pat. No. 4,032,976. Since the smear charge I area 114 in B register 104 for any given field period corresponds with the smear charge in area 112 in A register 102 during the immediately preceding field period, the smear charge I in area 114 is substantially reduced as a direct consequence the substantial reduction of smear charge in area 112 by the application of the erase signal, in accordance with the basic teaching of my prior art U.S. Pat. No. 4,032,976.

However, there is nothing in the teaching of my prior U.S. Pat. No. 4,032,976 which may be employed to prevent or to compensate for the smear charge II in area 118 of the B register, which corresponds with smear charge I in area 116 of the A register. However, in accordance with the principles of the first embodiment of the present invention, the effect of the smear charge II in area 118 of the B register may be substantially reduced, regardless of whether the projected image bright spot is fixed or is moving. This is accomplished during the second-occurring A to D transfer and readout period part (shown in FIG. 2c) of the vertical blanking period portion of each field period by applying control signals to A register 206 and D register 212 (see FIG. 2) over CCD imager control 204 to (1) effect the loading of D register 212 with a smear charge determined by the current position of any image bright spot on A register 206, and then (2) effect the serial readout of D register 212 to provide a smear input to smear memory 212. More specifically, the CCD imager control signals supplied to A register 206 to effect the loading of D register 208 constitute clock voltages similar to, but applied in such a way as to cause charge transfer in a direction opposite to that caused by the clock voltages conventionally employed to provide A to B register transfer. This requires at least a 3-phase CCD structure or, alternatively, split-electrode stages of a 2-phase CCD structure which permits voltage control of transfer direction. The result is to produce a reverse column shift in which the rows of A register 206, starting with the row adjacent D register 212, are shifted, one row at a time, into D register 212. At the same time, D register 212 is continuously run at higher than normal speed to serially shift, in turn, the unwanted loaded charge packets of each of the A register rows, except the last loaded row (i.e., the masked row 211 of A register 206, which is situated adjacent to B register 208) to the output of D register 212, to thereby dump the unwanted charge packets of these rows into a drain diffusion at the output end of D register 212. The result is that D register 212 is ultimately loaded with only charge packets that originated in the masked row 211 of A register 206 adjacent B register 208 that were transferred the entire length of A register 206 to D register 212. Therefore, regardless of the position of any current bright spot illuminating A register 206 during the transfer from A register 206 to the D register 212, the smear charge created by the A to D register transfer is stored in loaded D register 208 at the end of the A to D register transfer. However, the reverse column shifting during A to D transfer results in a smear charge being produced in area 112 (in a manner similar to the production of smear I charge in area 114 during forward shifting A to B transfer). The smear charge in area 112 is then removed by the application of an erase signal during the third-occurring erase period, as described above. It should be noted that the difference in time between the A to D register transfer and the immediately preceding A to B register transfer can be a relatively small portion of a field period (see FIGS. 2b and 2c). For example, in a typical imager system, the duration of a field period is about 16.7 milliseconds, while the time difference between an A to B register transfer and the following A to D register transfer is only about 0.4 milliseconds.

The smear charge in loaded D register 212 is shifted out, in serial fashion, during the vertical blanking period and, preferably, before the third-occurring erase period part thereof, to provide a smear input to smear memory 216. During shift output, smear memory 216 is placed in a write mode by timing and control 214. Therefore, in accordance with the address logic, the memory locations of smear memory 216, corresponding to a column of A register 206 in which smear charge exists, are loaded with information as to the amount of smear charge in that column. During each successive row of the following active video portion of a field, period smear memory 216 is read out in synchronism with the serial shifting out from C register 210 of the smeared video input to threshold detector 222 and the application of the smeared video input to the plus input of subtractor 224. However, the smear output from smear memory 216 is normally not forwarded to the minus input of subtractor 224 because gate 220 is normally closed. However, when threshold detector 222 detects a bright pixel in a particular row then being shifted out from C register 210, this bright pixel is stored in the corresponding column-address memory locations of memory 218. Therefore, during these corresponding column addresses of that particular row and every row of that field period which is subsequent to the particular row, bright pixel memory 218 produces an output which opens normally closed gate 220 and permits the smear output from smear memory 216 to be forwarded to the minus input of subtractor 220.

At the beginning of an active video portion of a field period (FIG. 2b), gate 220 is closed and will remain closed until threshold detector 222 detects the first row which contains each of the bright pixel signals of transfer bright spot 110a (FIG. 1c). During this row and all the remainder of the rows of that field period, gate 220 is opened in response to the column addresses defining both transfer bright spot 110a and smear charge I area 114 (FIG. 1c).

Therefore, in accordance with the principles of the first embodiment of the present invention, an erase signal of the type described in my U.S. Pat. No. 4,032,976 is produced in block 214 of block 202. This erase signal, applied as shown in FIG. 2c, is effective in substantially reducing the smear charge I shown in area 114 of FIG. 1c and D register 212 in cooperation with circuitry 202, shown in detail in FIG. 2a, is effective in substantially reducing the smear charge II shown in area 118 of FIG. 1c.

FIGS. 3, 3a, 3b and 3c relate to a second embodiment of the present invention which, in part, employs the teachings of my prior U.S. Pat. No. 4,010,319.

Figure 3:
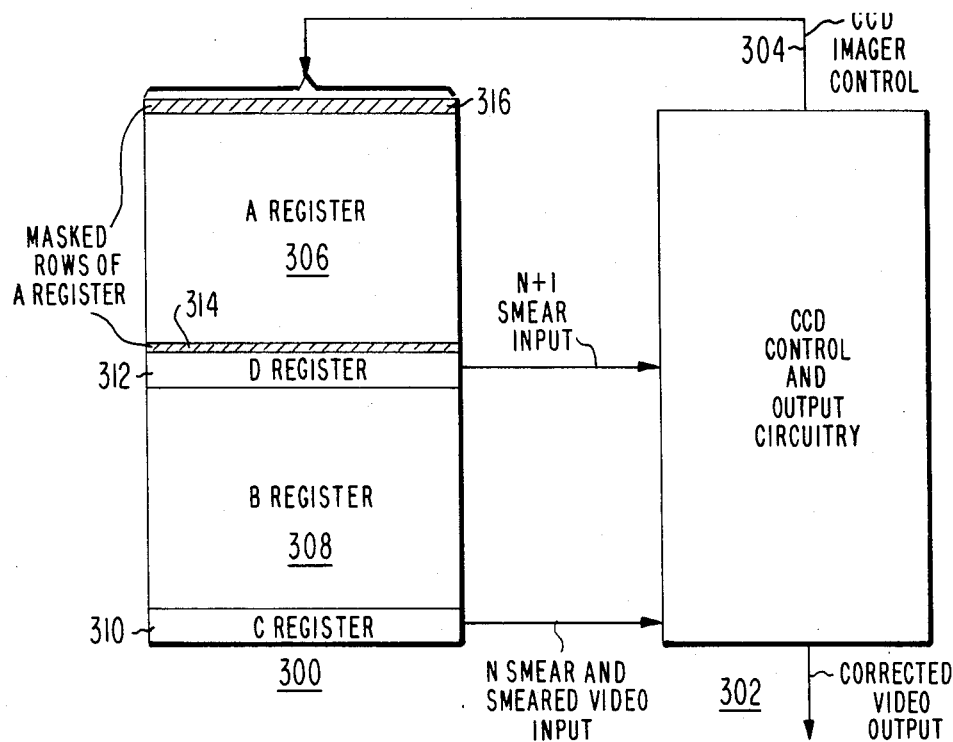
FIG. 3 is a block diagram which schematically illustrates a second embodiment of the present invention.

Referring to FIG. 3, there is shown a CCD field imager system comprising CCD field transfer imager 300 and CCD control and output circuitry 302 having CCD imager control output 304 coupled to imager 300. Imager 300 comprises conventional A register 306, B register 308 and C register 310. Imager 300 further includes D register 312 located at that one of the ends of A register 306 which is adjacent B register 308. This register is constructed so that vertical transfers can be made through its stages. Masked row 314 of A register 306 adjacent D register 312 is a physical row which is masked. FIG. 3 also shows an extra row 316 located at the top of A register 306 which is masked. Masked row 316 also may constitute a physical row of A register 306 which is masked from light or, alternatively, masked row 316 may constitute a "phantom" row situated immediately above the top physical row of A register 306. In any event, A to B register transfer results in masked row 314 being transferred to the row of B register 308 adjacent C register 310 and masked row 316 being transferred to D register 312.

The readout of D register 312, in serial fashion, provides an N+1 smear input to circuitry 302 and the serial shifting out of C register 310, a row at a time, provides an N smear and smeared video input to circuitry 302. Circuitry 302, the details of which are shown in FIG. 3a, provides a corrected video output in which smear is substantially reduced, regardless of whether the image illuminating A register 306 includes any fixed image bright spot and/or moving image bright spot.

Figure 3B:
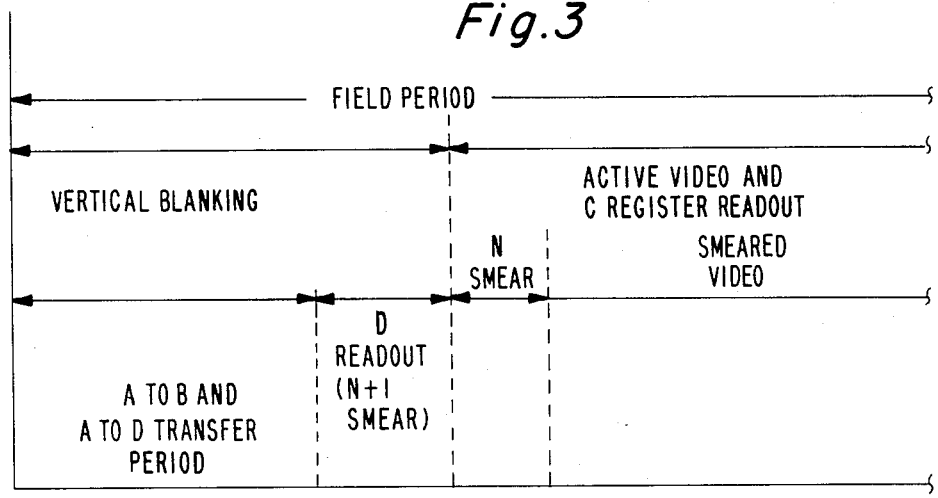

Referring to FIG. 3a, circuitry 302 comprises timing and control means 318 which generates as an output CCD imager control 304 (again, the single line represents multiple conductors). Timing and control means 318, which provides all the timing and control signals for operating imager 300, is generally similar to timing and control means 214 of FIG. 2a. Timing and control means 318 is effective in dividing each of successive field periods into a vertical blanking period portion and an active video and C register read out portion, as shown in FIG. 2b. However, timing and control means 318 divides the vertical blanking period portion of each successive field period into an A to B register transfer and A to D transfer period followed by a period during which the D register is read out to provide the N+1 smear input to circuitry 302. Further, as shown in FIG. 3b, the N smear input to circuitry 302 from C register 310 occurs during the serial shifting out of the first row of C register 310, while the smeared video input to circuitry 302 from C register 310 is shifted out of C register 310 during the remainder of the active video area portion of each successive field period.

Circuitry 302 further includes N+1 smear memory 320, N smear memory 322, and bright pixel memory 324. Timing and control means 318 provides an N read/write control input to N smear memory 322 and an N+1 read/write control input to N+1 smear memory 320. The N+1 smear input is applied to N+1 smear memory 320, and the N smear and smeared video input is applied to steering switch 326 and to the plus input of subtractor 328. A timing signal from timing and control means 318 is applied as a control input to steering switch 326 to effect the forwarding the N smear input to N smear memory 322 during the N smear part of the active video portion of each field period shown in FIG. 3b. During the remainder of the active video period portion of each field period, shown in FIG. 3b, steering switch 326 effects the forwarding the smeared video input as an input to threshold detector 330. The output from threshold detector 330 is applied as an input to bright pixel memory 324 and also as an input to edge detector 332. Edge detector 332 applies respective left and right edge outputs therefrom as inputs to bright pixel memory 324. Timing and control means 318 applies a reset signal and logic addresses to both N+1 smear memory 320 and N smear memory 322, which are similar to smear memory 216. The reset signal and logic addresses are also applied to bright pixel memory 324, which is generally similar to bright pixel memory 318. The respective outputs of N+1 smear memory 320 and N smear memory 322 are applied as signal inputs to smear switch 334. The output from bright pixel memory 324 is applied as a control input to smear switch 334. The output from smear switch 334 is applied to the minus input of subtractor 328. The output from subtractor 328 is the corrected video output from circuitry 302.

Considering the operation of the second embodiment of the present invention shown in FIGS. 3 and 3a, masked row 316 (whether physical or phantom) never receives any picture image information. However, the transfer of masked row 316 (during A to B register transfer) the entire length of A register 306 to D register 312 results in any image bright spot on A register 306 generating smear charge which is loaded into D register 312. Similarly, A to B register transfer during any given field period results in similar smear charge being stored in masked row 314 of A register 306. As indicated in FIG. 3b, the loading of D register with smear charge and the reading out of the smear charge from the loaded D register both take place during the same field period. However, the smear charge stored in masked row 314 must first be transferred to the row of B register 308 adjacent to C register 310 during the following A to B register transfer (which takes place during the next field period), before it can be shifted out of C register 310. Therefore, the output from D register 312 represents the current N+1 smear information, while the N smear (representative of the smear that existed during the preceding field period) is serially shifted out from C register 310.

At the beginning of each field period, memories 320, 322 and 324 are cleared by the reset signal and smear switch 334 is placed in a first switch position in which N input to smear switch 334 is forwarded as the minus input to subtractor 328. N+1 smear memory 320 and N smear memory 322 are placed in their write mode by respective read/write control inputs N+1, and N, resulting in the N+1 smear input and the N smear input, respectively, being stored at the appropriate column address locations of N+1 smear memory 320 and N smear memory 322, respectively. Therefore, initially the output from N smear memory 322 is forwarded through smear switch 334 to the minus input of subtractor 328 to provide the corrected video output. However, should threshold detector 330 detect the contiguous bright pixels of a bright spot in any particular row then being shifted out of C register 310, these bright pixels will be stored in bright pixel memory in the column address locations at which they occur. This causes a bright pixel control input to smear switch 334 from the output of bright pixel memory 324 to occur at those column address locations at which the bright pixels are stored during the serial shifting out of each row subsequent to the particular row from C register 310 for the remainder of that field period. This causes smear switch 334 to be operated at the column address locations of each of these subsequent rows to forward the output from N+1 smear memory 320 as the minus input to subtractor 328.

In order to be noticeable, the width of a displayed bright spot and its consequent smear has to be at least a few percent of the width of the display. Thus, in the case of an imager consisting of 320 pixels in the horizontal direction, in order to be noticeable, the width of a bright spot and its consequent smear would normally consist of 8, 10 or more contiguous pixels. As shown in FIG. 1c, there is an offset in the horizontal direction between the respective positions of smear II area 118 and transfer bright spot 10a, on the one hand, and smear I area 114, on the other hand. This offset is caused by a moving bright spot that moves from left-to-right. The amount of this offset depends on the speed of movement and the length of a field period. Obviously, if the movement were right-to-left, the offset would be in the opposite direction. Normally information as to speed and direction of movement are not available. This creates a problem in the operation of smear switch 334, which problem is solved by the operation of edge detector 332.

The output from threshold detector 330, in response to detection of a bright spot, is to produce at its output a plurality of contiguous bright pixels, which in number are proportional to the width of the bright spot. Bright pixel memory 324 stores all of these bright pixels at the column address locations thereof. At the same time, edge detector 332 includes circuitry (such as differentiating circuits or the equivalent) that determine the occurrence of the leading edge of the left most pixel of the bright spot and the lagging edge of the right most pixel of the bright spot. In response to the left output from edge detector 332, bright pixel memory 324 stores bright pixels at a predetermined number of contiguous column address locations which extend to the left of the column address at which the left most pixel of the bright spot is stored. In a similar manner, bright pixels will be stored in a predetermined number of column address locations of bright pixel memory 324 which extend to the right of the column address location at which the right most bright pixel of the bright spot is stored. In practice, the predetermined number is preferably equivalent to about 2% of the screen width. Thus, for an imager with 320 horizontal pixels in a row, the predetermined number would be about 5 or 6 column address locations on both the left and the right, respectively.

The presence of additional bright pixels stored in bright pixel memory 324 by edge detector 332 increases the number of contiguous column address locations for which smear switch 334 forwards the output of N+1 smear memory 320 to subtractor 328.

Figure 3C:
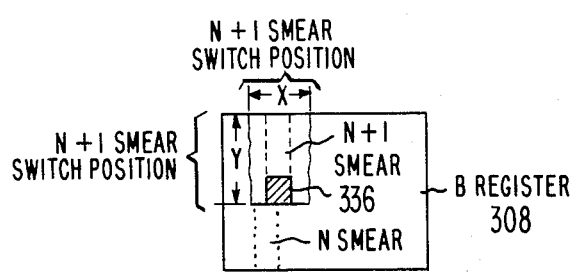
FIG. 3c illustrates the manner of operation of the second embodiment of the present invention in reducing all the smear when the projected image bright spot is moving.

More specifically, reference is made to FIG. 3c, which shows that in response to the read out of transfer bright spot 336, smear switch 334 remains in its N+1 smear switch position during those times that pixels in the x-y area of FIG. 3c are being serially shifted out from C register 310. It can be seen, that the width x is more than sufficient to cover the combined widths of the offset between the N smear and the N+1 smear regardless of whether the N smear is to the left of the N+1 smear (as is the case in FIG. 3c, where it is assumed that the moving object is moving from left-to-right) or is to the right of the N+1 smear (which would be the case if the moving object were moving from right-to-left). If it were not for the presence of edge detector 332, the output from N smear memory 322 would remain effective in the area having a vertical dimension y and a width equal to the difference between a left edge of the N smear and the left edge of the N+1 smear in FIG. 3c.

Thus, the second embodiment of the present invention, shown in FIGS. 3 and 3a, is capable of providing a corrected video output in which substantially all of the smear is substantially reduced.

Reference is made to U.S. Pat. No. 3,777,061, which issued to Takemura on Dec. 4, 1973. This patent discloses the field-transfer CCD imager physical arrangement in which a B register is located above a A register and in which a line register situated in between the B and A registers functions as a C register. The third embodiment of the third invention shown in FIGS. 4, 4a and 4b, utilizes the line register situated between the B and A registers of Takemura's physical arrangement as a combined C and D register. By doing so, it becomes possible in the third embodiment of the present invention to eliminate the need for a separate C register, conventionally situated at the end of the A register remote from the B register (as is shown in FIGS. 1, 2 and 3).

Figure 4:
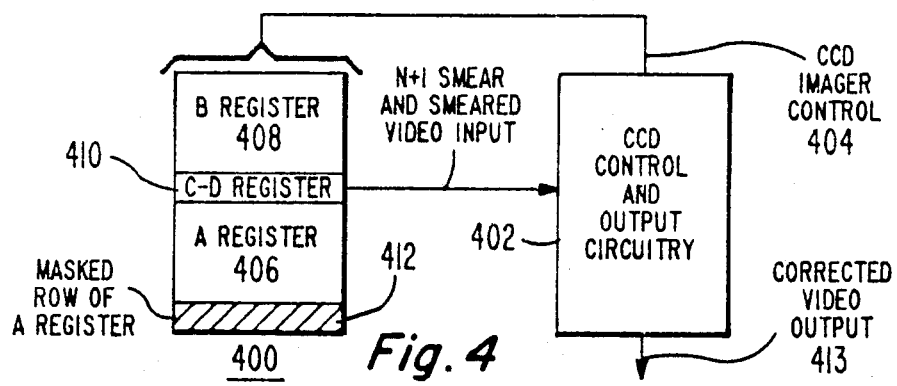
FIG. 4 is a block diagram which schematically illustrates a third embodiment of the present invention.

Referring to FIG. 4, there is shown field-transfer CCD imager 400 comprised of A register 406, B register 408 situated above A register 406, and C-D register 410 situated in between A register 406 and B register 408. The last row 412 of the A register (which may be either a physical row or a phantom row) is situated at the end of A register 406 remote from B register 408.

CCD control and output circuitry 402 provides CCD imager control 404 for controlling the operation of the registers of imager 400. More particularly, conventional imaging optics project an upside-down image on A register 406, so that the top line of the image is projected on the row of A register 406 adjacent to mask row 412 and the bottom line of the image is projected on the row of A register 406 adjacent the C-D register 410. Then, after the integration time period, CCD imager control 404 provides parallel column shift in an upward direction to effect the transfer of the projected image charge pattern from A register 406 to B register 408 and from masked row 412 to C-D register 410. After the A to B transfers are stopped, line 412 resides in the C-D registers. The transfer of masked row 412 through the entire length of A register 406 to C-D register 410, results in C-D register 410 being loaded with smear charge resulting from any image bright spot illuminating any portion of any column of the area of A register 406. CCD imager control 404 then causes C-D register 410 to be serially read out to provide an N+1 smear input to CCD control and output circuitry 402. At this time, C-D register 410 is functioning as a D register. Thereafter, CCD imager control 404 causes a parallel column shift of B register 408 in a downward direction to load C-D register 410 with no more than a single row of pixel charges at a time and then causes C-D register 410 to be serially shifted out to provide a smeared video input of that row to CCD control and output circuitry 402. This process continues until all of the rows of B register 408, corresponding to an image field, are read out from C-D register 410. Because B register 408 is located above A register 406 (rather than below the A register as in FIGS. 1, 2 and 3), the upward shifting of the upside down projected image from the A to the B registers, followed by the downward shifting from the B to C-D registers, results in the top line of the image being read out first and the bottom line of the image being read out last from the C-D register 410.

Figure 4A:
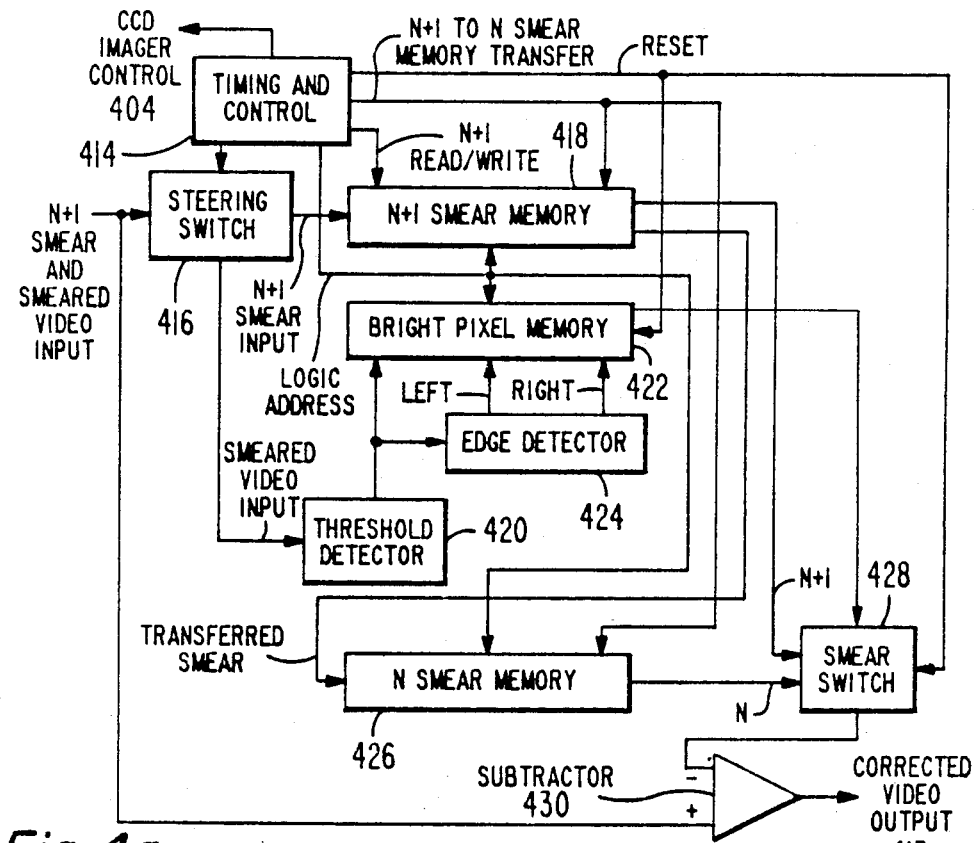
FIG. 4a is a more detailed illustration of the CCD control and output circuitry of the third embodiment of the present invention shown in FIG. 4.

CCD control and output circuitry, shown in detail in FIG. 4a, processes the N+1 smear and smeared video input thereto to derive a corrected video output therefrom. First, specifically, as shown in FIG. 4a, CCD control and output circuitry 402 is comprised of timing and control means 414 for deriving the appropriate CCD clock voltages and control signals applied to imager 400 by CCD imager control 404, which are employed by imager 400 in the manner described above to produce from C-D register 410 the N+1 smear and smeared video input to CCD control and output circuitry 402. As shown in FIG. 4a, the N+1 smear and smeared video input are applied as a signal input to steering switch 416. The input to steering switch 416 is forwarded to the input to N+1 smear memory 418 during the time that the N+1 smear is being shifted out of C-D register 410 and is forwarded to the input of threshold detector 420 during the time that the smeared video input is being shifted out of C-D register 410. The output from threshold detector 420 is applied as an input to bright pixel memory 422 and as an input to edge detector 424. Respective left and right outputs from edge detector 424 are applied as additional inputs to bright pixel memory 422. The logic addresses from timing and control means 414 are applied as control inputs to N+1 smear memory 418, bright pixel memory 422 and N smear memory 426 for addressing each successive column address location in these memories, in turn. Timing and control means 414 also applies an N+1 read/write control signal to N+1 smear memory 418 and an N+1 to N smear memory transfer signal to N+1 smear memory 418. In response to the N+1 to N smear memory transfer signal, N+1 smear information stored in the respective column address locations of N+1 smear memory is transferred to corresponding address locations of N smear memory 426. The output of N smear memory 426 is supplied as an N signal input to smear switch 428 and the output from N+1 smear memory 418 is applied as an N+1 signal input to smear switch 428. The output from bright pixel memory 422 is applied as a control input to smear switch 428 for controlling smear switch 428 in a manner similar to the control of smear switch 334 by the output from bright pixel memory 324. The output from smear switch 428 is applied as a minus input to subtractor 430 and the N+1 smear and smeared video input is applied as a plus input to subtractor 430. The output from subtractor 430 constitutes the corrected video output 413 from CCD control and output circuitry 402. At the end of each field period, timing and control means 414 applies a reset signal to bright pixel memory 422 and to smear switch 428.

Figure 4B:
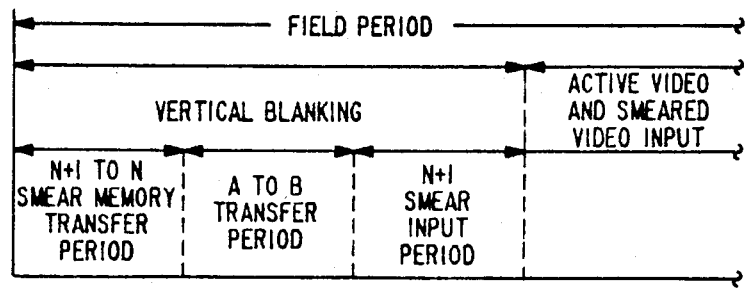
FIG. 4b is a timing diagram useful in describing the operation of the third embodiment of the present invention in reducing all the smear when the projected image bright spot is moving.

As indicated in FIG. 4b, N+1 to N smear memory transfer takes place at the beginning of each successive field period during the vertical blanking portion thereof. Thus, the smear information from the immediately previous field period stored in the N+1 smear memory 418 is transferred at the beginning each successive field period to N smear memory 426. As shown in FIG. 4b, the entire time interval of the vertical blanking portion of each successive field period during which a CCD imager control 404 is effective in causing transfer from A register 406 to B register 408 occurs after the completion of the N+1 to N smear memory transfer. However, it should be understood that in practice, any part or all of the A to B transfer could occur while N+1 to N smear memory transfer is taking place. However, the N+1 smear input period shown in FIG. 4b, during which the N+1 smear is serially shifted out from C-D register 410 and forwarded through steering switch 416 as an input to N+1 smear memory 418, occurs during the vertical blanking portion of each successive field period only after the completion of both the N+1 to N smear memory transfer and the A to B transfer.

As indicated in FIG. 4b, during the active video portion of each successive field period, the C-D register 410 is loaded in parallel from B register 408, at most one row at a time, and then each row loaded into C-D register 410 is serially shifted out before the next row thereof is loaded into and shifted out from C-D register 410. The pixel charge signals of the charge pattern store in the B register, which are serially shifted out of the C-D register during the active video portion of each successive field period, constitute the smeared video input. During the active video portion of each successive field period, steering switch 416 forwards the smeared video input to threshold detector 420.

During the active video portion of each successive field period, N+1 smear memory 418, threshold detector 420, bright pixel memory 422, edge detector 424, N smear memory 426, smear switch 428 and subtractor 430 cooperate with each other in a manner substantially similar to that of the corresponding elements of FIG. 3a to provide a corrected video output 413 at the output of subtractor 430. More particularly, during the active video portion of the current one of each successive field period, the smear information stored in N+1 smear memory 418 is produced by the A to B transfer that occurred during the vertical blanking portion of that current field period, while the smear information stored in N smear memory 426, (which is transferred thereto from the N+1 smear memory 418 at the beginning of the vertical blanking portion of the current field period) was produced by the A to B transfer which occurred during the vertical blanking portion of the field period which immediately preceded that current field period.

The operation of threshold detector 420, bright pixel memory 422, edge detector 424 and smear switch 428 is substantially identical to that of the corresponding elements in FIG. 3a of the second embodiment of the present invention. Further, the resetting of bright pixel memory 422 and smear switch 428 at the reset signal from timing and control means 414 is substantially identical to that described above in connection with the second embodiment of the present invention.

It is not essential that memory 418 be dedicated to N+1 smear and memory 426 be dedicated to N smear, which is transferred thereto from memory 418 at the beginning of each successive field, as in the case in FIG. 4a. Alternatively, the N+1 smear input forwarded through steering switch 416 can alternately applied on successive fields first to one and then to the other of memories 418 and 426, so that each of memories 418 and 426 take turns at being respectively an N+1 smear memory and an N smear memory. This would eliminate the need to transfer smear from one memory to the other, although smear switch 428 would have to reverse its coupling between its two signaling inputs on alternate fields.

The present invention is applicable to other types of field-transfer CCD imager systems from those specifically described herein, such as interline imager systems, for instance.

What is claimed is:

1. In a field-transfer CCD imager system comprising a CCD imager for deriving a video signal output from an image projected on said imager, said imager being of a type which includes (1) a photosensing A register for integrating said projected image during a first portion of each of successive field periods to produce a charge pattern of pixels arranged in rows and columns during an integration portion of a field period, (2) a masked B register to which the entire charge pattern is transferred in the column direction during a second portion of each of said successive field periods and while said A register remains unmasked, said transfer causing any bright spot of said projected image to produce a smear charge in said column direction, with a first part of that smear charge being transferred to said B register and a second part of that smear charge remaining in said A register, and (3) a masked line register into which the charge pattern stored in the B register is shifted, at most a row at a time, and from which pixel charge signals are shifted in serial fashion, during said first portion of each successive field period, whereby the first part of any smear charge appearing in the pixel charge signals shifted from said line register during any certain field period originates in the transfer from said A register to said B register during a first particular field period and the second part of any smear charge appearing in the pixel charge signals shifted from said line register during that certain field period originates in the transfer from said A register to said B register during a second particular field period that immediately precedes said first particular field period; the improvement:

wherein said CCD imager includes a masked line register situated at one end of said A register, which second-mentioned line register can be loaded, during said second portion of each field period, with solely smear charge that appears during that field period in respective columns of said A register, and which smear charge stored in said loaded second-mentioned line register can be serially shifted out during a certain time interval within each successive field period, and wherein said CCD imager system further comprises means including said second-mentioned line register and responsive to said pixel charge signals shifted from said first-mentioned line register for at least substantially reducing the amounts of both the first and second parts of smear charge that appear in said video signal output during each successive field period, despite any movement in the row direction of the position of any image bright spot during the time interval of a field period that exists between successive transfers of charge pattern from said A register to said B register.

2. The imager system defined in claim 1, wherein a single common C-D line register situated in between said A register and said B register constitutes both said first-mentioned and said second-mentioned line registers, said certain time interval within each successive field period occurring within said second portion of each successive field period, whereby said single common line register operates as said first-mentioned line register during said first portion of each successive field period and operates as said second-mentioned line register during said second portion of each successive field period.

3. The image system defined in claim 1, wherein said first-mentioned line register is a C line register situated at that end of said B register remote from said A register, and said second-mentioned line register is a D line register.

4. The imager system defined in claim 3, wherein said D register is situated at the end of said A register remote from said B register, wherein said smear charge reducing means includes timing and control means for (1) applying a reverse column shift signal for a first interval of each second portion of successive field periods, said first interval occurring subsequent to the transfer of said charge pattern from said A register to said B register, to reverse column shift the content of the row of said A register adjacent said B register into said D register and thereby load into said D register any smear charge that results from the presence of an image bright spot during said reverse column shift, (2) serially shifting out a smear charge signal from said loaded D register during a second interval of each second portion of successive field periods, said second interval occurring subsequent to said first interval, and (3) applying an erase signal for a third interval of each second portion of successive field periods, said third interval occurring subsequent to said second interval, to thereby erase any second part of said smear charge that exists in said A register, and wherein said smear charge reducing means further includes circuit means coupled to said timing and control means and responsive to said smear charge signal from said D register and to said pixel charge signals from said C register for deriving said video signal output.

5. The imager system defined in claim 4, wherein said circuit further comprises:

a smear memory coupled to said timing and control means and responsive to said smear charge signals during each field period for storing for the remainder of that field period the smear charge signal from each column at a separate column address location, and for repetitively reading out, in serial fashion, during said remainder of that field period smear memory output signals from said smear memory in synchronism with the serial shifting out of each successive row of pixel charge signals from said C register, a threshold detector responsive to said pixel charge signals for detecting the occurrence of bright pixels in each row shifted out from said C register, whereby in response to each image bright spot during a field period said threshold detector produces as an output a pulse having a width between leading and lagging edges thereof corresponding to the number of contiguous bright pixels contained in the width of that image bright spot, a bright-pixel memory coupled to said timing and control means and responsive to the output from said threshold detector for storing, for the remainder of a field period, any bright pixel detected during that field period at the column address location of said detected bright pixel and then reading out, as a bright-pixel memory output, said stored bright pixels at each column address thereof in synchronism with the shifting of each subsequent row from said C register during the remainder of that field period, and a normally closed gate, having the smear memory output signals applied as a signal input thereto and the bright pixel memory output applied as a control input thereto, for deriving gated smear memory output signals from only those column addresses at which a bright pixel is stored, and subtractor means for subtracting said gated smear memory output signals from said pixel charge signals from said C register to derive said video signal output.

6. The imager system defined in claim 3, wherein said D register is situated in between said A register and said B register, wherein said A register includes a masked row adjacent said D register and the respective number of unmasked rows in said A register and rows in said B register are such that the transfer of said charge pattern from said A register to said B register during the second portion of any given field period results in the smear charge produced during that given field period being transferred to both said D register and to said masked row adjacent said D register, and also results in the smear charge that was transferred to said masked row during the second portion of the field period that immediately preceded said given field period being further transferred during the second portion of said given field period to that row of said B register, adjacent to said C register, which is the first row to be shifted into and then shifted out from said C register as first smear charge signals, and wherein said smear charge reducing means includes timing and control means for reading out said D register in serial fashion to derive second smear charge signals, and circuit means coupled to said timing and control means and responsive to said first and second smear charge signals and to said pixel charge signals from said C register for deriving said video signal output.

7. The imager defined in claim 6, wherein said circuit further comprises:

first and second smear memories coupled to said timing and control means and responsive respectively to said first and second smear charge signals during each field period for storing for the remainder of that field period the respective first smear charge signal and second smear charge signal from each column at a separate address location of said respective first and second smear memories, and for then repetitively reading out, in serial fashion, during said remainder of that field period respective first and second smear memory output signals from said respective first and second smear memories in synchronism with the serial shifting out of each successive row of pixel charge signals from said C register, a threshold detector responsive to said pixel charge signals for detecting the occurrence of bright pixels in each row shifted out from said C register, whereby in response to each image bright spot during a field period said threshold detector produces as an output a pulse having a width between leading and lagging edges thereof corresponding to the number of contiguous bright pixels contained in the width of that image bright spot, a bright-pixel memory coupled to said timing and control means and responsive to the output from said threshold detector for storing, for the remainder of a field period, any bright pixel detected during that field period at the column address location of said detected bright pixel and then reading out, as a bright-pixel memory output, said stored bright pixels at each column address thereof in synchronism with the shifting of each subsequent row from said C register during the remainder of that field period, smear switch means, having the respective first and second smear memory output signals applied as signal inputs thereto, for selectively forwarding to its output said first smear memory output signals in a first switch position thereof, and said second smear memory output signals, in a second switch position thereof, said smear switch means having a control input thereto applied from the output of said bright pixel memory for placing said smear switch means in its first switch position in response to the presence of a bright pixel memory output, and in its second switch position in response to the absence of a bright pixel memory output, and subtractor means for subtracting the output from said smear switch means from said pixel charge signals from said C register to derive said video signal output.

8. The imager system defined in claim 7, wherein said circuit further comprises:

means coupled to said bright pixel memory and responsive to a bright pixel which occurs at least one of the edges of a pulse output from said threshold detector for storing an additional bright pixel in each of a certain number of contiguous column address locations of said bright pixel memory which extend from the column address location at which said edge bright pixel is stored.

9. The imager system defined in claim 8, wherein said edge detector means is responsive to both the bright pixel which occurs at the leading edge and the bright pixel which occurs at the lagging edge of said pulse output from said threshold detector for (1) storing an additional bright pixel in each of a first certain number of contiguous column address locations of said bright pixel memory which extend from the column address location at which said leading edge bright pixel is stored, and for (2) storing an additional bright pixel in each of a second certain number of contiguous column address locations of said bright pixel memory which extend from the column address location at which said lagging edge bright pixel is stored.

10. The imager system defined in claim 9, wherein said first and second certain numbers have the same given value.

* * * * *